US005997304A

United States Patent [19]
Wood

[11] Patent Number: 5,997,304

[45] Date of Patent: Dec. 7, 1999

[54] INTERACTIVE PHONICS LEARNING MAT

[75] Inventor: Michael C. Wood, Emeryville, Calif.

[73] Assignee: Knowledge Kids Enterprises, Inc., Emeryville, Calif.

[21] Appl. No.: 08/792,248

[22] Filed: Jan. 31, 1997

[51] Int. Cl.[6] .................... G09B 21/00

[52] U.S. Cl. .................... 434/169; 434/167; 434/156; 434/178; 434/317

[58] Field of Search .................... 434/308, 309, 434/317, 112, 116, 156, 157, 167–169, 178, 179, 185

[56] References Cited

U.S. PATENT DOCUMENTS 4,884,972 12/1989 Gasper .

*Primary Examiner*—Glenn E Richman
*Attorney, Agent, or Firm*—Coudert Brothers

[57] ABSTRACT

This invention relates to a phonics and reading teaching device which depicts an arrangement of indicia representing letters of the alphabet and their associated phonemes. Selection of individual indicia causes the device to generate an audio signal or other response. The audio signal is generated by an output in the form of a speaker, and a processor is provided for controlling the operation of the device. In one mode of operation, the processor causes the speaker to produce a prompting signal indicating a word, and in response to each sequentially correct selection of a letter in the word, to produce a signal representative of a phoneme associated with the letter. The phoneme produced is dependent on the position of the letter in the word. When all of the letters in the word have been selected in correct order, the processor causes the speaker to produce a signal representing a pronunciation of the word or other affirmative acknowledgement. In another mode of operation, the processor operates in a "Make a word" mode. The processor responds to a selection of a letter by causing the speaker to produce a signal representative of the name or phoneme of the letter, and waits for another letter to be selected. After a predetermined number of letters have been selected, the processor causes the speaker to produce a signal representative of phonemes associated with each of the letters and a signal representative of a pronunciation of the sequence of letters.

30 Claims, 3 Drawing Sheets

INTERACTIVE PHONICS LEARNING MAT

BACKGROUND OF THE INVENTION

1. Field of the Invention

This invention relates to children's education toys and more particularly, to an interactive phonic teaching device.

2. Background

Children learn letters, numbers and the names of various objects by audible repetition accompanied by visualization of the object. Often, a parent or teacher will read a book aloud while pointing to the object depicted by the word which is read. In this way, the child is able to visually associate the object with its name. This method of teaching is generally passive, i.e., there may be little interaction between the child and subject matter. Interactive teaching methods using multiple sensory perceptions are more effective than mere memorization, and kinesthetic engagement has been shown to enhance learning.

Voice synthesizers are used in a number of devices and children's toys. These devices are advantageous in that a child may use them interactively alone, without close supervision. Other devices use voice synthesis devices for various purposes. U.S. Pat. Nos. 4,357,489 to Henderson and 4,689,811 to Kroon each disclose an integrated circuit for synthesizing speech. U.S. Pat. No. 4,646,350 to Batra employs such an integrated circuit in a child's shoe to provide an audible message when opening or closing the shoe. Often, however, the devices of the kind mentioned above fail to provide meaningful learning when incorporating voice synthesis devices. In U.S. Pat. No. 5,188,533 to Michael C. Wood, there is a significant advance made in the art to overcome some of the deficiencies noted above.

This invention further builds and improves on the advances made in the Wood '533 patent. The device described herein provides many advantages over prior art devices in such a way as to invite interaction with children and facilitate the learning process for speaking, reading and memorization.

SUMMARY OF THE INVENTION

Briefly, therefore, this invention provides for a phonics and reading teaching device. The device comprises a mat depicting an arrangement of indicia representing letters of the alphabet and their associated phonemes. Individual indicia can be selected by a user, typically by pressing them, which causes the device to generate an audio signal or some other response. The audio signal is generated by an output in the form of a speaker, and a processor is provided for controlling the operation of the device. The processor causes the speaker to produce a prompting signal indicating a sequence of letters, and in response to each sequentially correct selection of a letter in the sequence, to produce a signal representative of a phoneme associated with the letter. The sequence of letters may represent a word, and the phoneme produced in response to the correct selection of a letter may be dependent on the position of the letter in the sequence. The prompting signal may include pronunciations of the word, phonemes in the word, and letters in the word. When all of the letters in the sequence have been selected in correct order, the processor causes the speaker to produce a signal representing a pronunciation of the word or other affirmative acknowledgement.

Typically, the processor is operable in several different modes. In a first mode, the processor responds to a selection of a letter by causing the speaker to produce a signal representative of the name of the letter. In a second mode, the processor causes the speaker to produce a prompting signal indicating a letter, and in response to the selection of the correct letter, to produce an affirmative signal. In a third mode, the processor causes the speaker to produce a signal representative of the name of a letter and of at least one phoneme associated with the letter, in response to a selection of the letter. In a fourth mode, the processor causes the speaker to produce a prompting signal indicating a phoneme, and in response to selection of the correct letter representing the phoneme, to produce an affirmative signal. In the fifth mode, the processor prompts the user to sound out one of sixty common three-letter words. When the user sounds out the three letters, the speaker is caused to pronounce the word formed by those three letter sounds, together with a congratulatory remark. In the sixth mode, the processor operates in a "Make a word" mode. The processor responds to a selection of a letter by causing the speaker to produce a signal representative of the name of the letter, and waits for another letter to be selected. After a predetermined number of letters have been selected, if the selected letters form a word, the processor causes the speaker to produce a signal representative of phonemes associated with each of the letters and a signal representative of a pronunciation of the word. A mode switch is provided for placing the device in one of the above-described operational modes.

The device comprises a plurality of switches associated with the indicia to indicate their selection to the processor. The device may be in the form of a mat, with indicia configured to be selectable by a hand or by a foot, or in a travel version, with indicia selectable by fingers. The arrangement of indicia includes consonants and vowels, with the vowels being distinguishable as a group from the consonants in the arrangement.

DETAILED DESCRIPTION OF THE INVENTION

Figure 1:
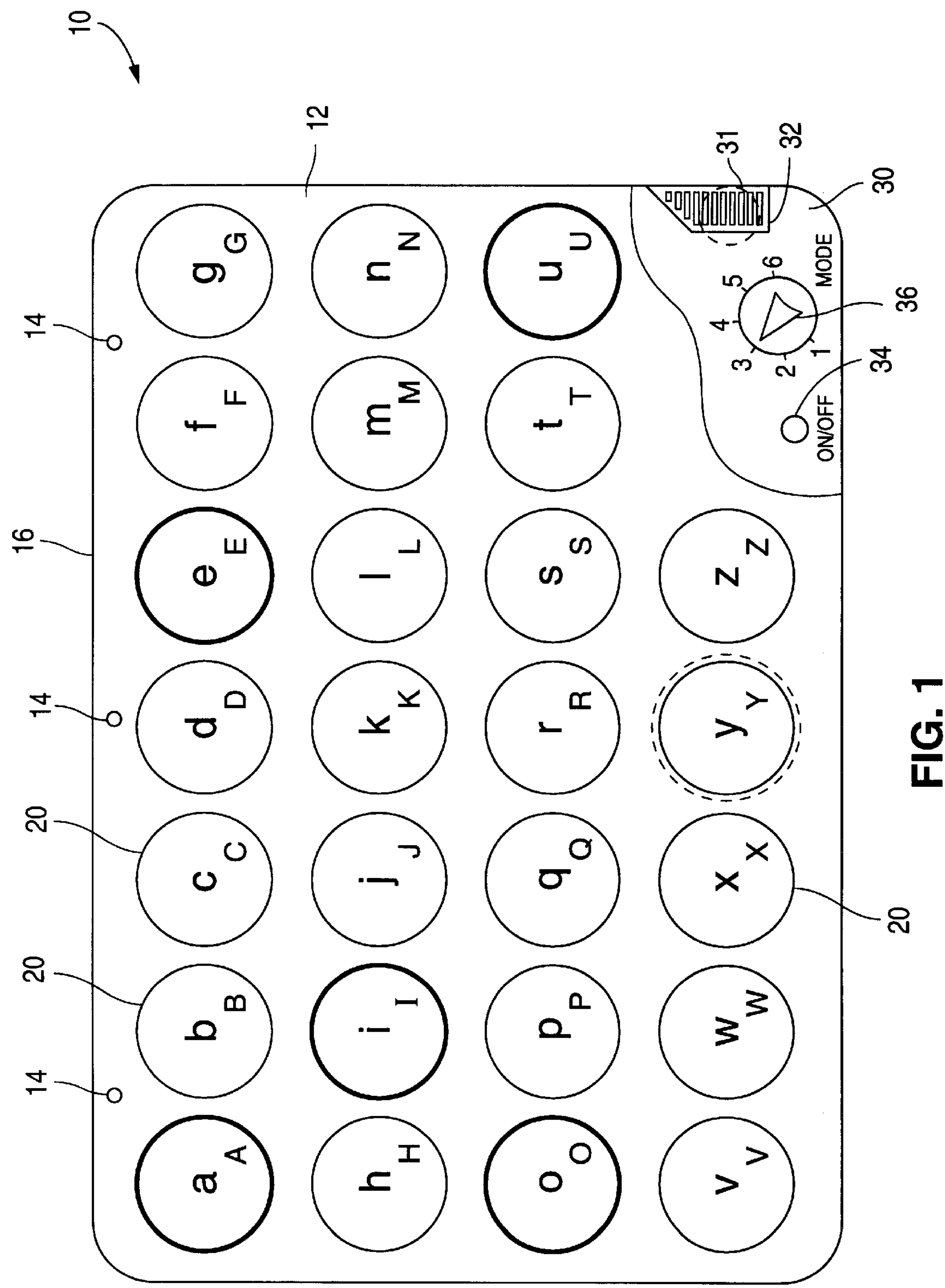
FIG. 1 is a schematic plan view of a phonics teaching device in accordance with the invention.
Figures 2, 2A, 2B:
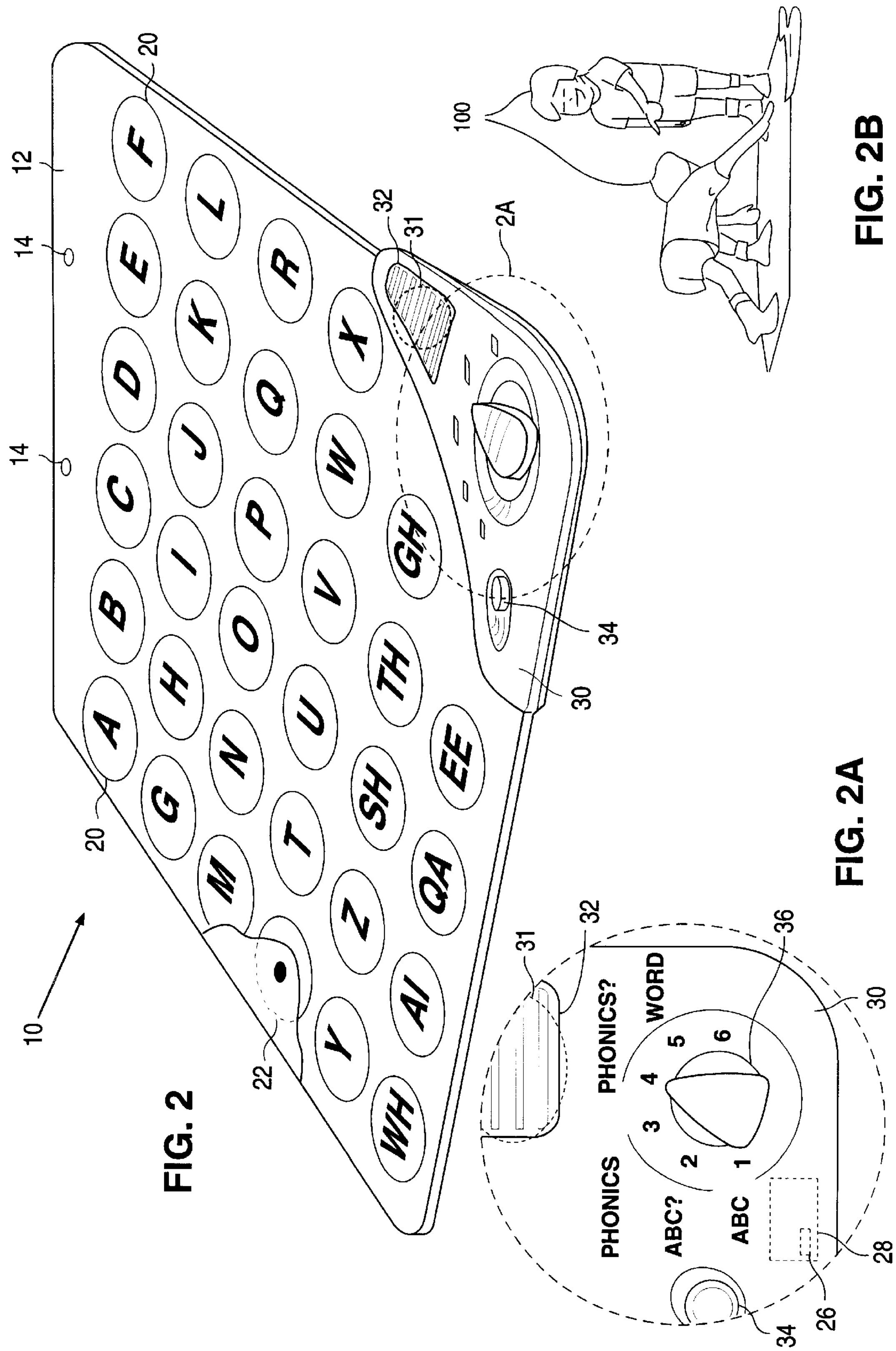
FIG. 2 is a perspective view of another phonics teaching device in accordance with the invention, showing its usage by children.

A language teaching device 10 in accordance with the invention is shown in FIGS. 1 and 2. A mat 12 having a substantially planar and rectangular shape is provided with an arrangement of indicia representing language symbols. In the embodiment described, the language symbols include letters of the English alphabet, both singly and in combination (such as the digraphs depicted in FIG. 2). Other languages may be used, such as German, Spanish, French, Danish, or Greek. The indicia are depicted on keys 20 arranged in a regular pattern, in order of their appearance in the English alphabet from left to right, and from top to bottom.

Figure 3:
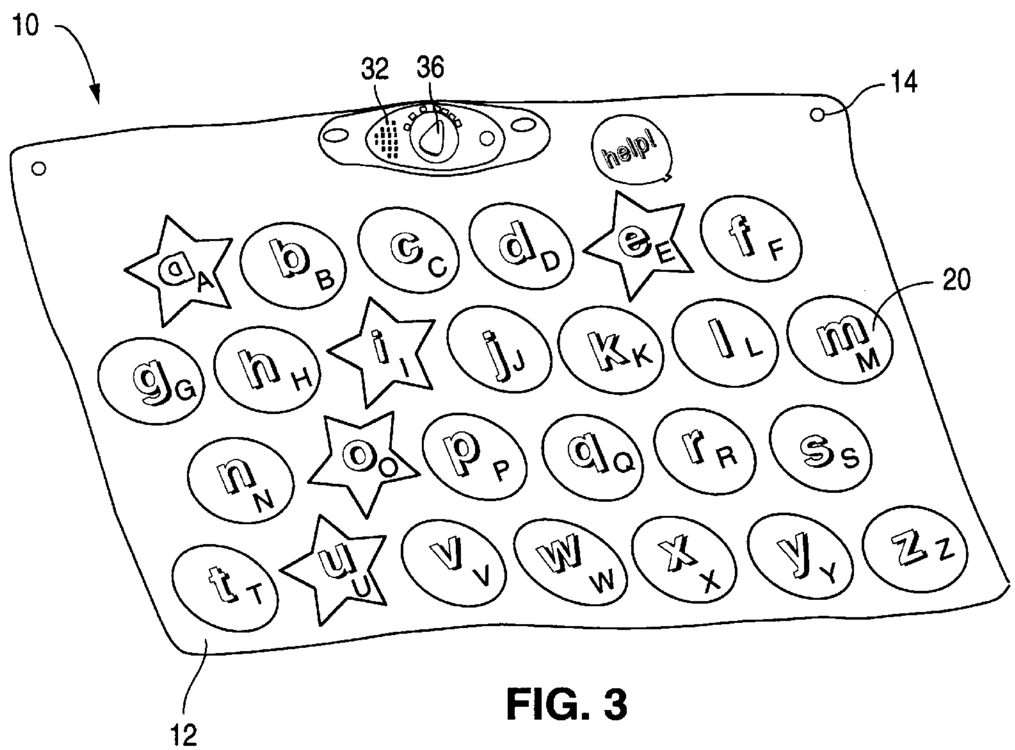
FIG. 3 is a schematic plan view of another embodiment of the phonics teaching device in accordance with the invention.
Figure 4:
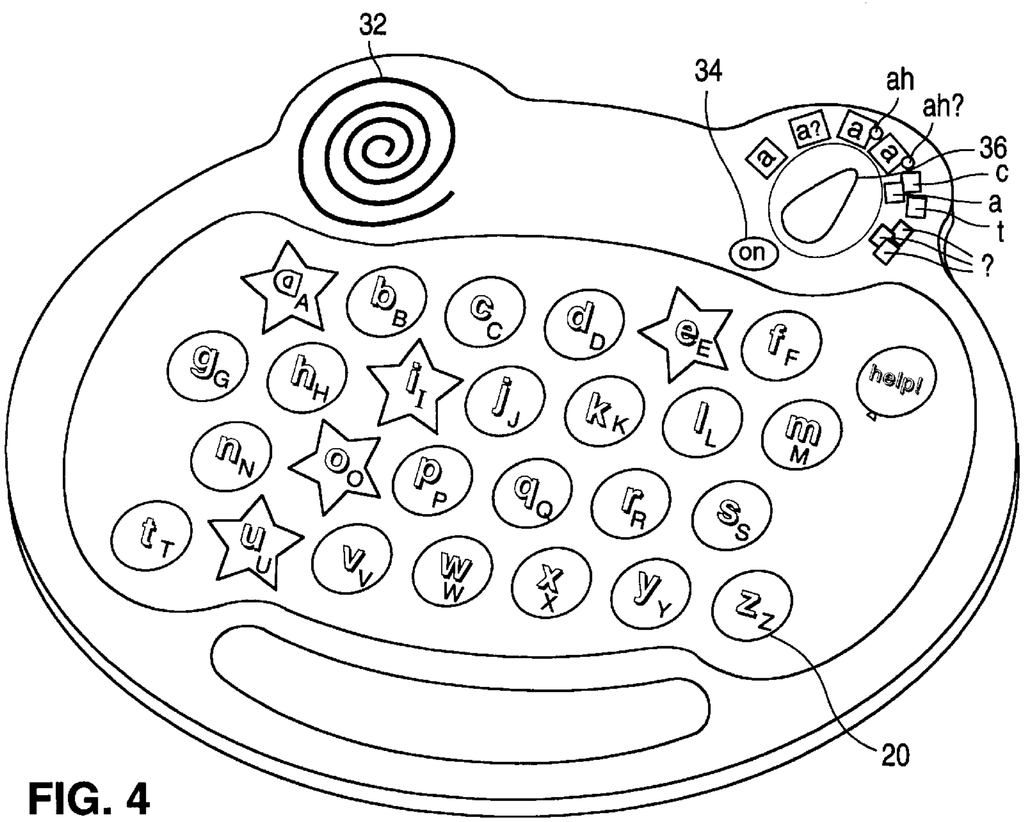
FIG. 4 is a schematic plan view of a handheld embodiment of the phonics teaching device in accordance with the invention.

The mat 12 shown is an approximately 27"×39" vinyl mat that can either lie on the floor or be hung on a wall by means of grommets 14 across the top edge 16. The keys 20 are sized to be pressed by a hand or a foot. The mat 12 can thus be used in a manner similar to the popular Twister™ game, and users 100 can learn letters, sounds, and words by hopping on the touch-sensitive keys 20 or by pressing them with their hands as shown in FIG. 2. The embodiment of FIG. 2 includes additional keys with indicia representing digraphs such as "th", "sh", and "ch". Although not shown, other digraphs such as "ai", "oi", and "ea" may be represented, in addition to diphthongs and consonant blends. Additionally, the mat 12 may be provided with a Help key 21, as illustrated in FIGS. 3 and 4.

In the preferred embodiment, the indicia representing vowels are visually distinguished as a group from the indicia representing consonants. This is done by means of different coloring of the indicia, but may also be accomplished by using different shapes, raised surfaces, or other distinguishing characteristics, either singly or in combination. Other groups and classes of indicia may be distinguished in a similar manner. For example, in FIG. 1, the letters "A", "E", "I", "O", and "U" are shown in thick outline, while the letter "Y" is shown with a dotted circle around its key, in accordance with the familiar "AEIOU sometimes Y" rule. On the other hand, in FIG. 3, the vowels are shown in the shape of stars.

Each key 20 has a selector in the form of a pressure-sensitive switch 22 placed under the top surface of the mat 12, directly below the indicium. Each pressure-sensitive switch 22 is electrically connected to a processor 26 and activation of a pressure-sensitive switch 22 causes an electrical signal to be sent to the processor 26 indicating selection of the indicium corresponding to the pressure-sensitive switch 22. Similarly, if the mat 12 is provided with a Help key 21, selection of the Help key 21 is indicated by a switch 22.

Other means of sensing selection of a key 20 may also be used, such as providing the keys 20 with touch-sensitive surfaces that send electrical signals to the processor 26 when touched, or optically sensing selection of the key 20. Such means are well-known in the art. Further description may be seen by reference to U.S. Pat. No. 5,188,533, issued Feb. 23, 1993, and to U.S. Pat. No. 5,511,980, issued Apr. 3, 1996, the disclosures of which are hereby incorporated by reference.

The embodiment illustrated in FIG. 1 has a rigid plastic housing 30 at the lower right corner of the mat 12, which houses a battery, a speaker 31, and the processing circuitry 28. The housing 30 has a grille 32 for allowing sounds from the speaker 31 to be emitted from the housing 30, an ON/OFF switch 34, and a mode selector in the form of knob 36 for selecting a mode of operation. The housing 30 further has markings on it indicating the various modes selectable by the knob 36. As shown in FIG. 3, however, the housing may be located elsewhere on the mat 12, such as in the center of the upper edge.

The processing circuitry 28 includes a processor 26, random access memory (RAM), read-only memory, a random number generator, and a voice synthesizer for driving the speaker 31. The read-only memory, which may be provided in the form of a Programmable Read-Only Memory (PROM), contains program instructions for operating the processor 26. The read-only memory further contains data such as a dictionary, language symbols, phonemes, and sequences of symbols and phonemes. The voice synthesizer includes a memory for storing data representing pronunciations of language symbols and combinations of language symbols. Other configurations of the processing circuitry 28 are possible, such as providing a separate read-only memory or removable memory for storing the data, or combining the functions of the processor 26 and the voice synthesizer into a single unit.

The knob 36 is electrically connected to the processor 26 and is used to select a device mode of operation. Six modes of operation are provided in the illustrated embodiment. The processor 26 enters the mode of operation selected by the knob 36 when the knob 36 is turned to that mode, or when the ON/OFF switch 34 is turned to ON. After an initialization cycle, which may include a self-test, the processor 26 begins execution of the program instructions stored in the PROM.

In overview, the unit 10 operates in one of the following six modes of operation:

1) The unit will speak the names of the language symbols when they are selected.
2) The unit will ask the user to find language symbols randomly. For example, the unit will say "Find the letter A," and will congratulate the user when the correct language symbol is found. All incorrect language symbols will cause the unit to produce a negative acknowledgement, such as "Boing!".
3) The unit will speak the names of the language symbols and their phonic sounds. For example, pressing A will cause the unit to say "A says 'A' and 'Ahh'."
4) The unit will randomly ask the user to find language symbols according to the sound or sounds that they make and will congratulate them when the correct answer has been found. For example, the unit will say "Find the letter that says 'Cuh'" and when the key representing C is pressed, the unit will say "C says 'Cuh'" followed by a congratulatory acknowledgement. Incorrect letters will result in a "Boing!".
5) The unit will randomly select words and actively teach the user how to spell and sound out the words. The unit will say the word, spell it, or state the phoneme components, then direct the user to select the appropriate language symbols. When the user selects the appropriate language symbols, the letters will make their phonic sounds, teaching the user to make the connection between the names of language symbols and their sounds. For example, the unit will say "Cat is spelled C-A-T and is made of the sounds 'Cuh', 'Ah', and 'Tt'. Now you find the letters which spell 'Cat'." The user must select the language symbols C, A, and T in the correct sequence. Selecting incorrect language symbols will cause the unit to produce a "Boing!", or alternatively, cause the unit to prompt the user; e.g., "You're looking for the letter that says 'Cuh'."
6) In the "Make a word" mode, the unit will pronounce the names of the language symbols of the alphabet when they are pressed. After three language symbols have been selected, the processor will give the phonetic pronunciation of each of the language symbols utilizing simple phonetic rules and then pronounce the sequence of language symbols as a word.

In the first mode of operation, when an indicium is selected by pressing on its key 20, thereby activating the pressure-sensitive switch 22, an electrical signal is sent to the processor 26. In accordance with the program instructions and data stored in the PROM, the processor 26 then directs the voice synthesizer to produce a signal corresponding to the name of the language symbol represented by the selected indicium. The voice synthesizer in turn drives the speaker 31 to produce a sound corresponding to the name of the language symbol. The processor 26 then waits for another indicium to be selected.

In the second mode of operation, the processor 26 obtains a random number from the random number generator and uses it to choose a language symbol, which is stored in the RAM. The processor 26 causes the voice synthesizer to produce a signal corresponding to the name of the language symbol, and the speaker 31 produces the corresponding sound. Preferably, the processor 26 causes the voice synthesizer to produce the name of the language symbol in conjunction with words. For example, if the language symbol selected is "A", the speaker 31 will say "Find the letter A." The processor 26 then waits for an indicium to be selected.

When an indicium is selected, the processor 26 looks up the language symbol corresponding to that indicium and compares it to the stored language symbol. If the selected language symbol is not the same as the stored language symbol, the processor 26 causes the voice synthesizer to produce a negative acknowledgement such as "Boing!". Alternatively, a negative acknowledgement such as "No" or "Wrong. Try again" may be issued, or the device 10 may simply remain silent. The processor 26 again waits for an indicium to be selected. If the selected language symbol is the same as the stored language symbol, the processor 26 causes the voice synthesizer to output a signal representative of the name of the language symbol and an affirmative acknowledgement, such as "Correct!" or "Bingo!". Several such acknowledgements may be stored in the PROM and used randomly. The processor 26 then repeats the above-described sequence.

In the third mode of operation, the processor 26 waits for an indicium to be selected. When an indicium is selected, the processor 26 causes the voice synthesizer to produce a signal corresponding to the name of the language symbol represented by the selected indicium. The voice synthesizer in turn drives the speaker 31 to produce a sound corresponding to the name of the language symbol. The processor 26 further directs the voice synthesizer to produce a signal corresponding to the phoneme or phonemes associated with the language symbol, and the voice synthesizer causes the speaker 31 to produce the sound or sounds. The processor 26 then waits for another indicium to be selected.

In the fourth mode of operation, the random number generator provides a random number to the processor 26, which uses it to choose a language symbol. The processor 26 then chooses a phoneme associated with the language symbol, and directs the voice synthesizer to produce a signal corresponding to the phoneme. The voice synthesizer drives the speaker 31 to produce the phoneme. Preferably, the processor 26 causes the voice synthesizer to produce the phoneme in conjunction with words. For example, if the language symbol selected is "C", and the phoneme is "Cuh", the speaker 31 will say "Find the letter that says 'Cu'." The processor 26 then waits for an indicium to be selected.

The user selects an indicium by pressing it, and the processor 26 determines whether the selected language symbol is the correct language symbol. If the selected language symbol is incorrect, a negative acknowledgement (or no sound) is produced and the processor 26 again waits for an indicium to be selected. If the selected language symbol is correct, the processor 26 causes the voice synthesizer to output a signal representative of the name of the language symbol, its phoneme, and an affirmative acknowledgement. The processor 26 then returns to the beginning of the cycle.

In the fifth mode of operation, the processor 26 randomly chooses a word. The processor 26 looks up the word in its ROM (or other data source) to determine the sequence of language symbols that form the word. The processor 26 then causes the voice synthesizer to produce a signal corresponding to the word, and the speaker 31 produces the word. The processor 26 further causes the voice synthesizer and speaker 31 to sequentially pronounce the names of the language symbols, or the phonemes, that form the word. Preferably, the processor 26 causes the voice synthesizer to produce the word, names of the language symbols, and their phonemes in that word, in conjunction with some prompting words. For example, if the word selected is "CAT", the speaker 31 will say "Cat is spelled C-A-T and is made of the sounds 'Cu', 'Ah', and 'Tt'. Now you find the letters which spell 'Cat'." The processor 26 then chooses the first language symbol in the sequence of language symbols to be the current language symbol, and waits for an indicium to be selected.

The user selects an indicium, and the processor 26 determines whether the selected language symbol matches the current language symbol. If the selected language symbol is incorrect, a negative acknowledgement such as a "Boing!" is produced, or alternatively, the unit will prompt the user to find the correct language symbol by stating its name or its phoneme; e.g., "You're looking for the letter that says 'Cuh'."

The processor 26 again waits for an indicium to be selected without changing the current language symbol. If the selected language symbol is correct, the processor 26 selects the phoneme of that language symbol being used in the word. The processor 26 directs the voice synthesizer to produce a signal corresponding to the phoneme, and the voice synthesizer causes the speaker 31 to produce the sound. The phoneme may be silent; i.e. if the language symbol corresponds to an "e" in the word "one", the "e" is silent and no sound is produced.

The processor 26 then changes the current language symbol to be the next language symbol in the sequence of language symbols, and waits for another indicium to be selected. If there are no more language symbols remaining in the sequence of language symbols, the processor 26 instructs the voice synthesizer and speaker 31 to say the word followed by a congratulatory phrase such as "Congratulations!" The names of the language symbols in the sequence may also be produced. The processor 26 then repeats the cycle.

The sixth mode of operation is the "Make your own three-letter word" mode. The processor 26 causes the voice synthesizer and speaker 31 to instruct the user to form a word by selecting keys 20. As each indicium is selected, the processor 26 causes the speaker 31 to pronounce the name of the language symbol associated with the indicium. After three language symbols have been selected, the processor 26 uses simple phonetic rules to choose phonemes associated with each of the language symbols, and causes the speaker 31 to produce signals representing the phonemes. Thereafter, the processor 26 causes the speaker 31 to pronounce the sequence of language symbols as a word, and returns to the beginning of the cycle to wait for a new sequence of three language symbols.

Alternatively, the processor 26 can be configured to cause the speaker 31 to pronounce a phonic sound of the language symbol when the indicium is selected. In this configuration, the processor 26 would choose a phoneme associated with the language symbol using simple phonetic rules, possibly including predictive algorithms to select the most appropriate phoneme.

In another mode of operation which may be added to or substituted into the above list of modes, the processor 26 randomly chooses a word and looks up the sequence of language symbols that form the word. The processor 26 then causes the voice synthesizer and speaker 31 to say the word with some prompting language, but without spelling the word or giving the phonemes. For example, if the chosen word is "CAT", the speaker 31 will say "Sound out CAT" and the processor 26 then waits for an indicium to be pressed. Operation thereafter is the same as in the fifth mode. Alternatively, the prompt could include the names of the language symbols or the phonemes, and be worded as "Cat is spelled C-A-T. Now you find the letters" or as "Cat is made of the sounds 'Cuh', 'Ah', and 'Tt'. Now you find the letters."

Further, in the "Make a Word" mode, the processor may be modified to use longer sequences of language symbols, and may use a dictionary to determine whether sequences of language symbols form a word. For example, in this mode, the processor 26 prompts the user and receives selections of language symbols as described in the sixth mode above. After three language symbols have been selected, the processor determines whether the sequence of language symbols is in its dictionary; i.e., whether the sequence forms a word. If the sequence forms a word, the processor 26 chooses phonemes associated with each of the language symbols and causes the speaker 31 to produce a signal representing the phonemes, and then a signal representing a pronunciation of the word. If the sequence does not form a word in the dictionary but is of the form consonant-vowel-consonant, the processor 26 chooses phonemes associated with each of the language symbols and causes the speaker 31 to produce a signal representing the phonemes, and may also produce a pronunciation of the sequence as if it were a word. If the sequence does not form a word in the dictionary and is not of consonant-vowel-consonant form, the unit may simply state the names of the language symbols and then wait for a new sequence of language symbols.

If the device 10 is provided with a Help key 21 as shown in FIGS. 3 and 4, selection of the Help key 21 causes the device 10 to produce a prompt or answer, depending on the mode of operation and the current state of the processor 26. If the help key is selected while the user is attempting to spell a word in response to a prompt, the processor 26 causes the speaker 31 to produce a signal indicative of a cue, such as repeating the word or giving its phonetic pronunciation. Further repeated selection of the Help key 21 causes the device 10 to give the answer. For example, if the word to be spelled is "CAT", and the user has found "C" but not "A" and selects the Help key 21, the device 10 will say "The word is CAT. The first letter is C. What is the second letter?" and optionally gives the phonetic pronunciation of the language symbol "A". If the user again presses the Help key 21 without selecting another language symbol, the device 10 will give the answer and prompt the user to find the next language symbol: "The second letter is A. What is the third letter?" In other modes, in which the user is not attempting to spell a word chosen by the processor 26, pressing the Help key 21 will cause the device 10 to recite instructions.

Further embodiments of the invention are shown in FIGS. 3 and 4. The mat of FIG. 3 has star-shaped vowel keys, a Help key 21, a mode switch 36 at the center of the upper edge, and no digraphs. FIG. 4 shows a handheld embodiment of the invention, with keys 20 sized to be pressed by a finger.

While the invention has been particularly shown and described with reference to a certain preferred embodiment, it will be understood by those skilled in the art that various alterations and modifications in form and in detail may be made therein. For example, the indicia represented may include non-language symbols or be arranged in an arbitrary manner. The unit may also be implemented in another form, such as a "talking book" or as a computer program. Additionally, variations in the modes of operation may be achieved, such as increasing the difficulty of the words in response to a series of correct answers, or, in a nonprompted mode, reciting a word whenever its language symbols are pressed in proper sequence. Variations of the disclosed processor configuration will be readily apparent to one skilled in the art. Accordingly, it is intended that the following claims cover all such alterations and modifications as may fall within the true spirit and scope of the invention.

What is claimed is:

1. A teaching device, comprising:

(a) an arrangement of indicia, each defining a language symbol and representing at least one phoneme;

(b) an output; and (c) a processor, configured to operate in at least one mode selected from the group consisting of:

in a first mode, the processor is configured to cause the output to produce a prompting signal representative of a sequence of language symbols, and in response to each sequentially correct selection of an indicium corresponding to one of the language symbols, to cause the output to produce a signal representative of a phoneme associated with the language symbol, wherein the signal produced is determined by the position of the language symbol in the sequence of language symbols; and in a second mode, the processor is configured to cause the output to produce a signal representative of a language symbol in response to a selection of one of the indicia, and when a predetermined number of language symbols has been selected in sequence, to cause the output to produce a signal representative of a phoneme associated with each language symbol in the sequence.

2. The teaching device as recited in claim 1, further comprising at least one selector operable to indicate selection of an indicium when activated.

3. The teaching device as recited in claim 2, wherein the processor is further configured to operate in at least one mode selected from the group consisting of:

in a third mode, the processor is configured to cause the output to produce a prompting signal indicating a phoneme associated with a language symbol, and in response to a selection of an indicium corresponding to the indicated language symbol, to cause the output to produce an acknowledging signal;

in a fourth mode, the processor is configured to cause the output to produce a signal representative of a name of a language symbol in response to a selection of one of the indicia;

in a fifth mode, the processor is configured to cause the output to produce a signal representative of a name of a language symbol and of at least one associated phoneme, in response to a selection of one of the indicia; and in a sixth mode, the processor is configured to cause the output to produce a prompting signal indicating a language symbol, and in response to a selection of an indicium corresponding to the indicated language symbol, to cause the output to produce an acknowledging signal.

4. The teaching device as recited in claim 3, wherein the at least one selector is configured to be selectable by a hand and selectable by a foot.

5. The teaching device as recited in claim 4, wherein the at least one selector comprises a pressure-sensitive switch.

6. The teaching device as recited in claim 1, further comprising a prompt key which, when activated, causes the processor to cause the speaker to produce a cue signal.

7. The teaching device as recited in claim 6, wherein in the first mode, the cue is the prompting signal representative of the sequence of language symbols.

8. The teaching device as recited in claim 7, wherein the cue is a signal representative of a phoneme associated with a language symbol in the sequence.

9. The teaching device as recited in claim 1, wherein the arrangement of indicia defines consonants and vowels, with the vowels being distinguished as a group from the consonants.

10. The teaching device as recited in claim 9, wherein the arrangement of indicia further defines at least one combination of letters.

11. The teaching device as recited in claim 10, wherein the arrangement of indicia further defines at least one combination selected from the group consisting of digraphs, diphthongs, and consonant blends.

12. An interactive learning device, comprising:

(a) a housing defining a plurality of indicia;

(b) a plurality of selectors configured to be selectable by at least one of the group consisting of a hand, a foot, and a finger;

(c) an output; and (d) a processor, configured (i) in a first mode, to cause the output to produce a signal representative of a name of a language symbol in response to a selection of one of the indicia.

13. The interactive learning device as recited in claim 12, further comprising a mode selector and wherein the processor is further configured to operate in a mode selected from the group consisting of:

(ii) in a second mode, the processor is configured to cause the output to produce a signal representative of a name of a language symbol and of at least one associated phoneme, in response to a selection of one of the indicia; and (iii) in a third mode, the processor is configured to cause the output to produce a prompting signal indicating a language symbol, and in response to a selection of an indicium corresponding to the indicated language symbol, to cause the output to produce an acknowledging signal.

14. The interactive learning device as recited in claim 13, wherein the processor is further configured to operate in one of the modes selected from the group consisting of:

(iv) in a fourth mode, the processor is configured to cause the output to produce a prompting signal representative of a sequence of language symbols, and in response to each sequentially correct selection of an indicium corresponding to one of the language symbols, to cause the output to produce a signal representative of a phoneme associated with the language symbol; and (v) in a fifth mode, the processor is configured to cause the output to produce a signal representative of a language symbol in response to a selection of one of the indicia, and if a predetermined number of language symbols has been selected in sequence, to cause the output to produce a signal representative of a phoneme associated with each language symbol in the sequence.

15. The interactive learning device as recited in claim 14, wherein the processor is further configured, in the fifth mode, to determine whether the sequence of language symbols forms a word, and if the sequence forms a word, to cause the output to produce a signal representative of a pronunciation of the word.

16. The interactive learning device as recited in claim 14, wherein the phoneme produced is determined by the position of the language symbol in the sequence of language symbols.

17. The interactive learning device as recited in claim 16, wherein in the fourth mode, an indicium in the sequence is associated with a silent "e" and selection of the indicium causes the signal produced to be a non-sound representing signal.

18. The interactive learning device as recited in claim 17, wherein the processor is further configured (vi) in a sixth mode, to cause the output to produce a prompting signal indicating a phoneme associated with a language symbol, and in response to a selection of an indicium corresponding to the indicated language symbol, to cause the output to produce an acknowledging signal.

19. The interactive learning device as recited in claim 18, further comprising a prompt key, configured to cause the device to produce a cue signal when the prompt key is activated.

20. The interactive learning device as recited in claim 18, wherein the plurality of indicia defines consonants and vowels, with the vowels being distinguished as a group from the consonants.

21. The interactive learning device as recited in claim 20, wherein the plurality of indicia further defines at least one combination of letters.

22. The interactive learning device as recited in claim 21, wherein the plurality of indicia further defines at least one combination selected from the group consisting of digraphs, diphthongs, and consonant blends.

23. The interactive learning device of claim 12 wherein, a) the housing comprises a mat; and b) the processor is configured to cause the output to produce a signal representative of a sequence of phonemes associated with a word-forming sequence of language symbols when a predetermined number of language symbols has been selected in a sequence that forms a word.

24. The interactive learning device of claim 23 wherein the processor is further configured to cause the output to produce a signal representative of a pronunciation of the word.

25. The interactive learning device of claim 24 wherein the processor is further configured, upon selection of a non-word-forming sequence of language symbols in a consonant-vowel-consonant form, to cause the output to produce a signal representative of a phoneme associated with each language symbol in the non-word-forming sequence.

26. The interactive learning device of claim 25 wherein the processor is further configured, in a second mode, to cause the output to produce a prompting signal indicating a phoneme associated with a language symbol, and in response to a selection of an indicium corresponding to the indicated language symbol, to cause the output to produce an acknowledging signal.

27. A teaching device, comprising:

(a) a mat including an arrangement of indicia, each defining a language symbol and representing at least one phoneme;

(b) an output; and (c) a processor, configured in a first mode, to cause the output to produce a signal representative of a language symbol in response to a selection of one of the indicia, and if a predetermined number of language symbols has been selected in a sequence forming a word, to cause the output to produce a signal representative of a phoneme associated with each language symbol in the word-forming sequence.

28. The teaching device as recited in claim 27, wherein the processor is further configured to cause the output to produce a signal representative of a pronunciation of the word.

29. The teaching device as recited in claim 28, wherein the processor is further configured, upon selection of a non-word-forming sequence of language symbols in a consonant-vowel-consonant form, to cause the output to produce a signal representative of a phoneme associated with each language symbol in the non-word-forming sequence.

30. The teaching device as recited in claim 29, wherein the processor is further configured, in a second mode, to cause the output to produce a prompting signal indicating a phoneme associated with a language symbol, and in response to a selection of an indicium corresponding to the indicated language symbol, to cause the output to produce an acknowledging signal.

* * * * *